US007695978B2

(12) United States Patent
Laprade et al.

(10) Patent No.: US 7,695,978 B2
(45) Date of Patent: Apr. 13, 2010

(54) MALDI TARGET PLATE UTILIZING MICRO-WELLS

(75) Inventors: Bruce Laprade, Holland, MA (US); Sharon Mrotek, Fiskdale, MA (US)

(73) Assignee: Burle Technologies, Inc., Wilmington, DE (US)

( * ) Notice: Subject to any disclaimer, the term of this patent is extended or adjusted under 35 U.S.C. 154(b) by 442 days.

(21) Appl. No.: 11/669,448

(22) Filed: Jan. 31, 2007

(65) Prior Publication Data

US 2008/0179513 A1 Jul. 31, 2008

(51) Int. Cl.
*G02B 6/00* (2006.01)

(52) U.S. Cl. ..................... 436/518; 435/287.1; 250/288

(58) Field of Classification Search ................. 436/518; 435/287.1; 250/288
See application file for complete search history.

(56) References Cited

U.S. PATENT DOCUMENTS 6,621,076 B1 * 9/2003 van de Goor et al. ....... 250/288
2005/0178959 A1 * 8/2005 Lopez-Avila et al. ....... 250/288

* cited by examiner

*Primary Examiner*—Kiet T Nguyen
(74) *Attorney, Agent, or Firm*—Dann, Dorfman, Herrell and Skillman, P.C.

(57) ABSTRACT

An arrangement for a MALDI sample plate for ion mass spectroscopy is disclosed. The sample is configured to shape the hypersonic explosion which creates the ions generated in a MALDI-type time-of-flight mass spectrometer. The MALDI sample plate includes a glass wafer formed from a plurality of clad glass fibers and has a first planar surface. The plate also has a plurality of micro-wells formed in the glass wafer. The micro-wells extend to a depth that is less than the thickness of the glass wafer and act to hold a spot sample in a manner that prevents spreading, maximizes the formation of ions, and shapes the resulting ion cloud to improve ion migration.

6 Claims, 4 Drawing Sheets

MALDI TARGET PLATE UTILIZING MICRO-WELLS

FIELD OF THE INVENTION

This invention relates to a sample plate for use in mass spectrometry, namely Matrix Assisted Laser Desorption Ionization (MALDI) mass spectrometry, and in particular to a MALDI plate having a plurality of micro-wells formed therein.

BACKGROUND OF THE INVENTION

A mass spectrometer is an analytical instrument which is capable of identifying an unknown material. The identification process begins by ionizing the unknown material. The ions are next separated by the mass to charge ratio. The ions are then detected by an electron multiplier which amplifies the weak signal produced by the ions. The amplified signals are then recorded by a computer or other instrument as a series of mass peaks. By comparing these mass peaks to those recorded in a library, the unknown material can be identified with a high degree of accuracy.

MALDI is a form of photo-ionization that has become a popular ionization technique for organic and biological compounds because the resulting series of ions is rich in structural information about the compound. In the MALDI process, the material to be analyzed (the analyte) is mixed with a matrix material in order to enhance the absorption of the energy from the photon source. The matrix material is typically a form of salt. The mixture of the analyte material and the matrix material is then spotted onto a target referred to as a MALDI Plate or MALDI Target. The spots are typically deposited in rows and columns by a robot. Each position corresponds to a sample number. Dozens of samples can be loaded onto a single sample plate, which is a significant productivity advantage. The spots are then dried of all solvents and the plate is loaded into the mass spectrometer for analysis. Loading and unloading of the mass spectrometer is also automated in modern machines.

FIG. 1 schematically illustrates the structure and operation of a MALDI time-of-flight mass spectrometer. The mass spectrometer 10 has an ionization section 12, an ion drift chamber 14, and a detection section 16. The ionization section 12 includes a target plate 18 on which at least one spot sample 20 is deposited and a pusher plate assembly 22 which is connected to a voltage source (not shown). A laser 24, preferably a nitrogen laser, is disposed for directing a pulsed laser beam 26 onto the spot sample 20. The detection section 16 includes a detector 28 which is preferably a microchannel plate-type ion detector.

In operation, the nitrogen laser 24 is operated to aim at a fraction of single spot. The laser is fired in a short burst which briefly exposes the selected spot sample to the intense light energy. The matrix material is specifically chosen to be able to absorb the energy from the laser pulse. As the matrix absorbs the laser energy, a hypersonic explosion occurs which causes the analyte material to fractionate and ionize.

The resulting ions are then pushed out into a field free region in the drift chamber 14 through the application of a high voltage pulse to the pusher plate assembly 22. The ions travel toward the detection section 16, with the lower mass ions reaching the detector 28 first and the highest mass ions arriving last. Each time a group of ions with the same mass reach the detector, a very fast voltage pulse is produced by the detector which can be recorded.

In the time-of-flight mass spectrometer 10, the exact mass of an ion can be determined, and therefore identified, by precisely recording the amount of time it takes for the ion to travel through the field free region. This is usually done by solving the equation $KE=\frac{1}{2}mv^2$.

The accuracy of a MALDI time-of-flight mass spectrometer depends not only on the precise recording of the ion arrival times, but also on the assumption that all the ions of a given mass arrive at nearly the same time. In practice this latter assumption is seldom achieved. Modern ion detectors have a temporal response of less than 400 picoseconds. However, the time window in which ions of the same mass arrive at the detector can be thousands of times longer than the response time. Although there are many contributing factors, one of the largest contributors is the spatial distribution of the ions immediately after the hypersonic explosion.

The analyte-matrix spot samples for MALDI analysis are typically deposited on a polished metal plate in rows and columns. When the laser radiation impinges on the matrix material, the resulting hypersonic explosion sends the ions out in all directions with significant velocity. FIG. 2 illustrates this effect. The ion cloud 30 is large and interdispersed with ions of very different masses. Because ions of like masses begin their journey from different locations within the ion cloud source, travel times will differ in proportion to the distance traveled. The differences in travel time are manifested as time jitter which serves to degrade the mass resolution.

SUMMARY OF THE INVENTION

An arrangement for a MALDI sample or target plate in accordance with the present invention resolves the aforementioned problems to a significant degree. The MALDI plate according to this invention is configured to shape the hypersonic explosion which creates the ions generated in a MALDI-type time-of-flight mass spectrometer.

In accordance with a first aspect of the present invention, there is provided a plate for receiving a plurality of spot samples. The plate includes a glass wafer formed from a plurality of clad glass fibers and has a first planar surface. The plate according to this aspect of the invention has a plurality of micro-wells formed in the glass wafer. Each micro-well extends to a depth that is less than the thickness of the glass wafer.

In accordance with a second aspect of this invention, there is provided a method of making a plate for use in a MALDI mass spectrometer. The method of this invention includes the following steps. A multifiber billet is formed from a plurality of clad glass fibers in which each of the clad glass fibers includes a soluble glass core and an insoluble glass cladding. In a second step, a cross-sectional wafer is cut from the multifiber billet. The wafer is exposed to a dissolving medium to dissolve the glass cores. The duration of the dissolving step is controlled so that the wafer is exposed to the dissolving medium for a time in which the glass cores are dissolved to a preselected depth that is less than the thickness of the wafer.

BRIEF DESCRIPTION OF THE DRAWINGS

The following description will be better understood when read in connection with the drawings, wherein.

DETAILED DESCRIPTION

Figure 1:
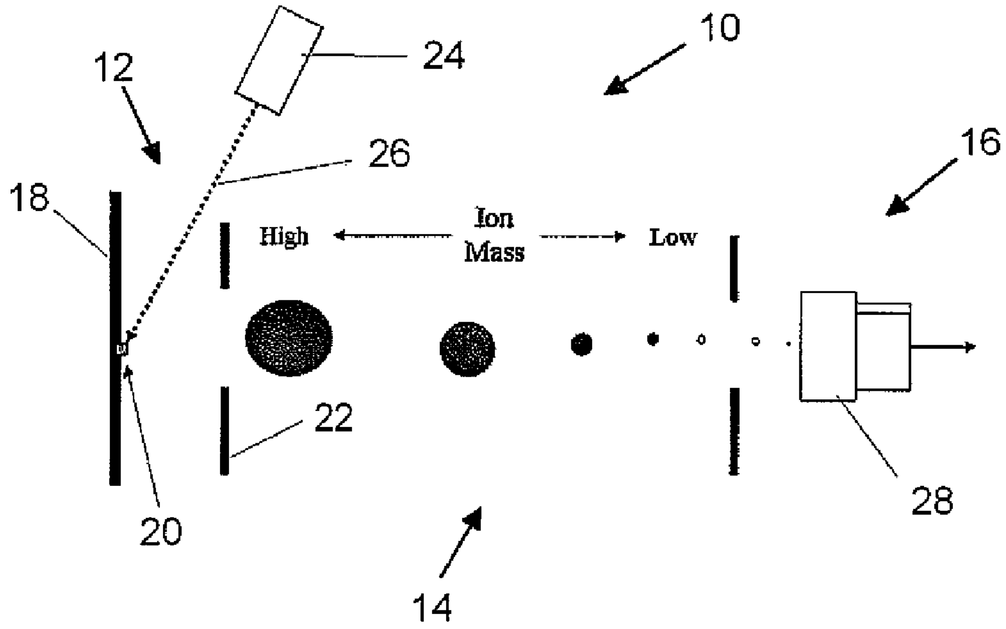
FIG. 1 is a schematic view of a known MALDI time-of-flight mass spectrometer.
Figure 3:
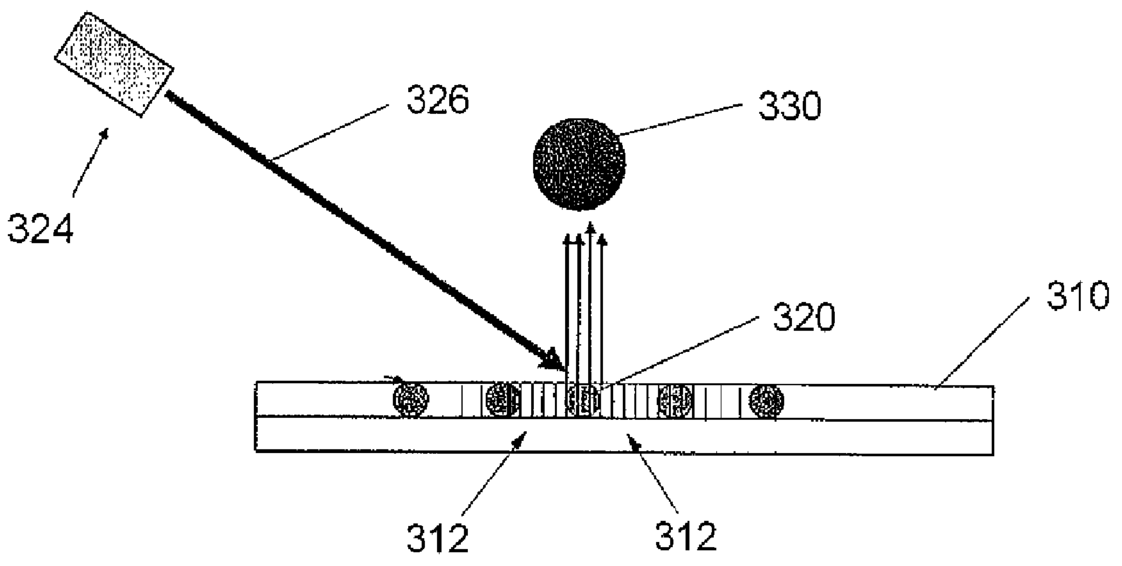
FIG. 3 is a schematic view of the ionization section of a MALDI mass spectrometer that incorporates a MALDI plate in accordance with the present invention.

The MALDI mass spectrometer according to this invention incorporates all of the features of the known MALDI mass spectrometer shown in FIG. 1 and described in the Background Section of this specification. However, the ionization section includes a target plate having a plurality of micro-wells as described and claimed below. Referring now to the drawings, and in particular to FIG. 3, there is shown schematically the ionization section of a MALDI mass spectrometer according to the present invention. A sample plate 310 has a plurality of micro-wells 312 formed therein for holding spot samples 320 of the material to be ionized and analyzed. A nitrogen laser 324 is disposed for projecting a laser beam onto a spot sample 320.

Figure 4:
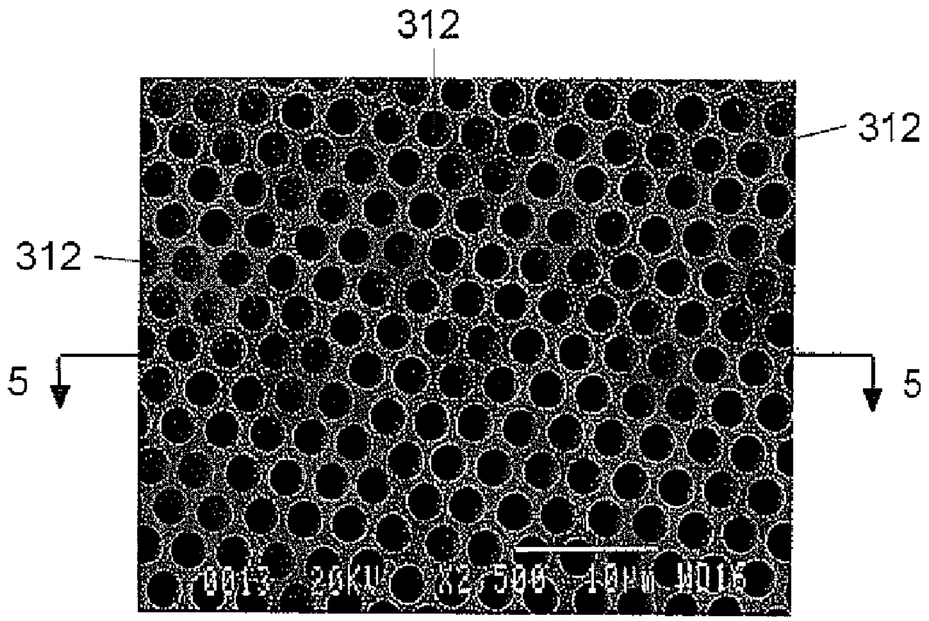
FIG. 4 is a photograph of a portion of a MALDI plate made in accordance with the present invention.
Figure 5:
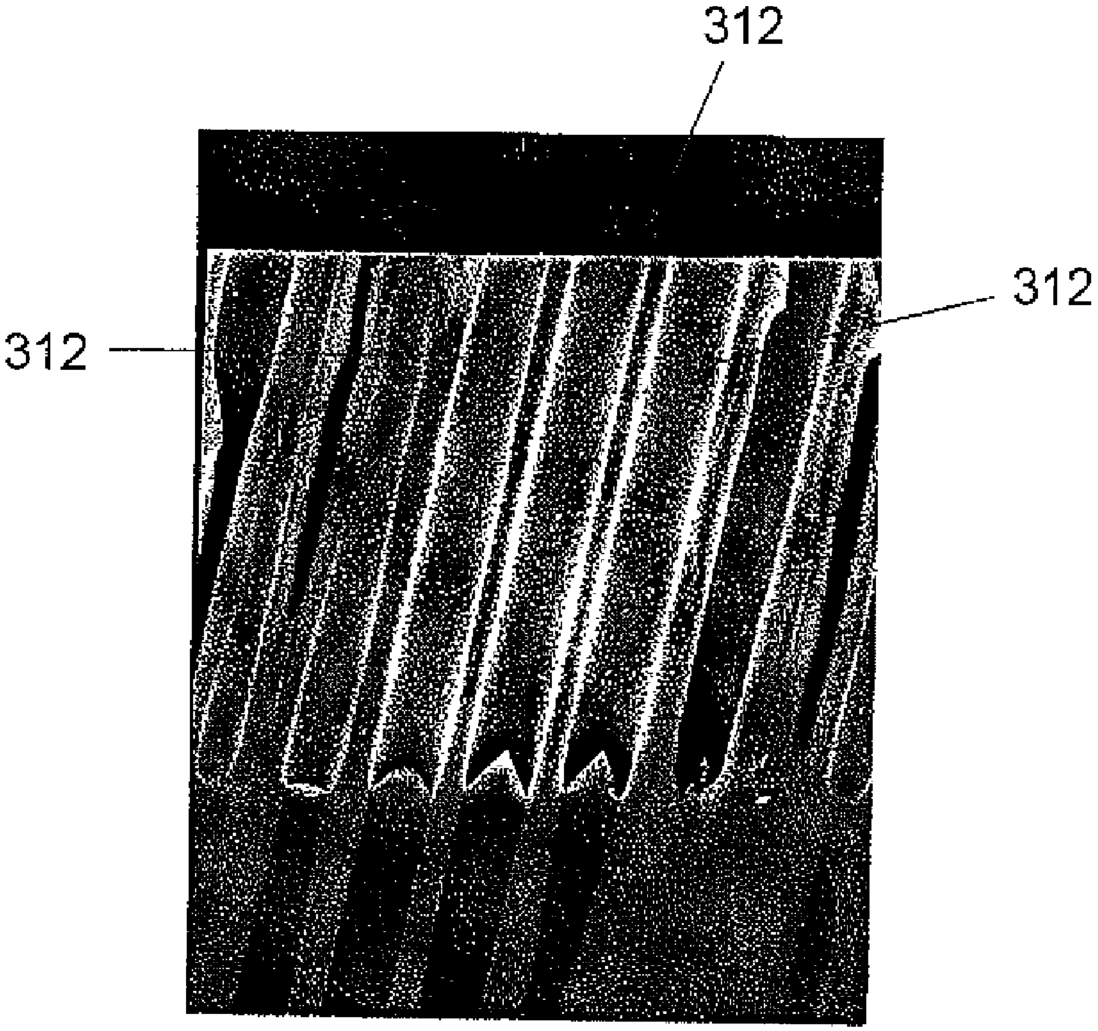
FIG. 5 is a photograph of a cross section of the MALDI plate shown in FIG. 4 as viewed along line 5-5 therein.

Referring now to FIGS. 4 and 5, the structure of the MALDI target plate 310 can be seen. The plate 310 is formed from a composite lead silicate glass wafer into which the plurality of blind micro-wells 312 are etched. The micro-wells 312 are substantially homogeneous in size and may range from a couple of microns to several hundred microns in diameter. Preferably, the cross-sectional dimension of the micro-wells is about 10-25 μm, and for best results, is in the lower portion of that range. The openings into the micro-wells preferably constitute up to about 50% of the surface area of the wafer. The plate preferably has a thickness of about 150 microns (μm) to about 25 millimeters (mm). The preferred thickness depends upon the tolerances of the user's manufacturing equipment. However, a thickness of about 1 mm should be acceptable for many applications. The depth of the micro-wells is less than the thickness of the wafer, but is preferably about 50 to 100 μm, depending on the thickness of the wafer.

The micro-wells are formed on at least one side of the sample plate, but may be formed on both sides of the plate. The micro-wells are preferably oriented parallel to an axis that is perpendicular to the flat surface of the wafer. However, they may also be oriented at a small angle relative to that axis as known to those skilled in the art.

Figure 2:
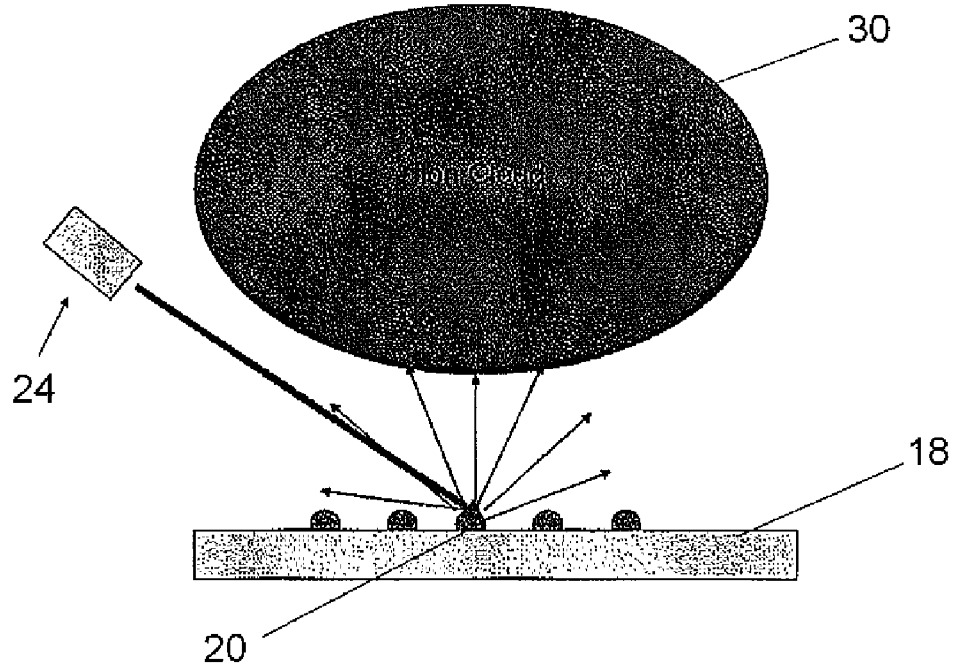
FIG. 2 is a schematic view of the ionization section of the mass spectrometer of FIG. 1 showing the ion cloud that develops immediately after the application of laser energy to a spot sample.

Prior to the start of an analysis, the sample spots containing a mixture of analyte and matrix material are deposited on the MALDI plate using conventional spotting techniques or by electrospray. With the known MALDI plate 18 (FIG. 2), the spot samples sit entirely on the surface of the plate. With the MALDI plate 310 (FIG. 3) according to the present invention, the deposited spot sample wicks down into the blind micro-well(s) 312. The micro-wells contain the spot in a fixed area. This containment feature prevents the spot from spreading out and inadvertently mixing with adjacent samples. In addition, the partitioning provided by the micro-wells prevents clumping of the matrix crystals during the drying process. This partitioning feature helps ensure that the laser energy is absorbed more uniformly in each cell, thereby eliminating the sweet spot effect common to MALDI samples. The sweet spot effect in a sample results when the matrix crystals are located in only one section of the spot. When the laser moves off the portion of the spot occupied by the crystal, the sample yields a relatively small number of ions.

In the MALDI mass spectrometer according to this invention, once the laser fires and initiates a hypersonic explosion to ionize the analyte, the dispersion of the resulting ion cloud is directed into a relatively small area as shown in FIG. 3. The more compact starting point of a spot sample in one or more micro-wells helps ensure that ions with like masses begin the flight down the mass filter in closer proximity. That effect results in less time jitter, which provides improved mass resolution.

Figure 6A:
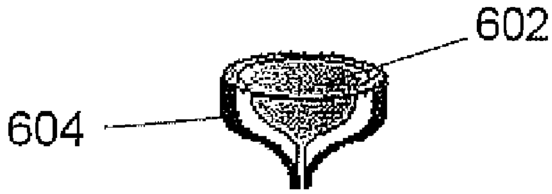
FIGS. 6A, 6B, 6C, 6D, 6E, and 6F are schematic representations of steps used in carrying out the process according to the present invention.
Figure 6B:

A micro-well MALDI plate according to the present invention is produced by a manufacturing method that is similar to the one used to manufacture microchannel plate electron multipliers. Referring now to FIGS. 6A to 6F, the process begins by inserting an acid soluble core rod 602 into a lead silicate glass tube 604 and drawing the rod and tube at an elevated temperature into a single fiber as shown in FIG. 6A. A multitude of such single fibers 606 are then combined into a hexagonal preform and subjected to a second high temperature draw process as shown in FIG. 6B.

Figure 6C:
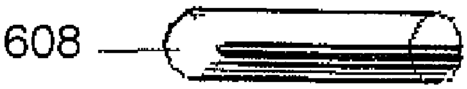
Figure 6D:
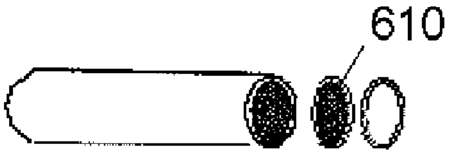

The resulting hexagonal multi-fiber is then stacked together and fused into an array 608 in block form as shown in FIG. 6C. MALDI target wafers 610 are then sliced from the block 608 as shown in FIG. 6D. The wafers are subjected to mechanical shaping techniques such as grinding and polishing as needed.

Figure 6E:
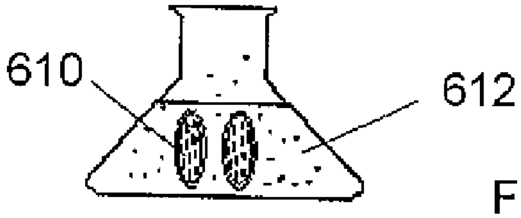

As shown in FIG. 6E, the wafer 610 is immersed in a weak acidic solution 612, such as hydrochloric acid, nitric acid, or acetic acid at a preferred concentration of about 10% or less. When the wafer is exposed to the acidic solution, the core glass begins to dissolve from the surface and into the bulk of the wafer. Dissolution is confined to the areas where the core glass is present. The glass cladding material which surrounds the core glass does not dissolve in the weak acidic solution. When it is desired to form the micro-wells on one side of the wafer, the other side is masked to prevent the acidic solution from reaching the core glass.

Figure 6F:
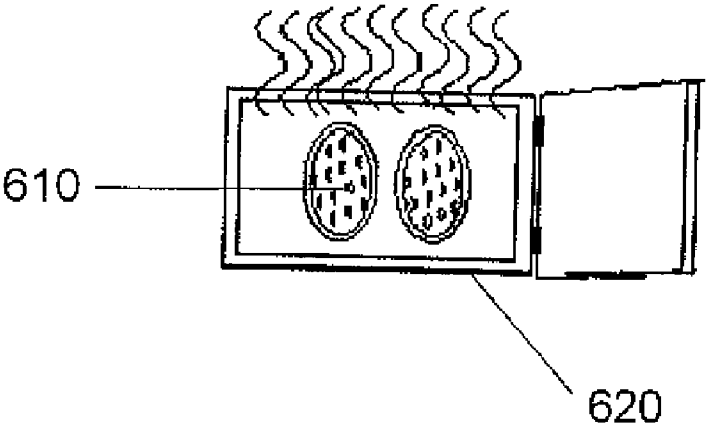

Controlling the exposure time, solution concentration and temperature enables the depth of etch to be controlled. To stop the etching process at any point, the wafer 610 is simply removed from the acidic solution and rinsed in deionized water. A final rinse in an organic solvent such as methanol can be used to remove residual water trapped in the blind micro-wells. As shown in FIG. 6F, the etched wafer 610 is preferably dried in a vacuum desiccator 620 to ensure that the micro-wells are clean and fully dry. Following the drying process the wafer is rendered electrically conductive by subjecting it to a hydrogen reduction process.

A micro-well MALDI plate in accordance with the present invention was fabricated and tested in a MALDI mass spectrometer. In the test, an analyte spot sample of a solution composed of 3 micro liters of imiprimine, 10 micro-liters of lidocaine, and 10 micro-liters of α-cyano-4-hydroxycinnamic acid (CHCA) matrix was deposited on the MALDI target plate. The plate was then inserted in a MALDI mass spectrometer and the spot sample was analyzed in the usual manner. A sample deposited on a conventional MALDI plate and analyzed provided significantly poorer resolution.

It will be recognized by those skilled in the art that changes or modifications may be made to the above-described embodiments without departing from the broad inventive concepts of the invention. It is understood, therefore, that the invention is not limited to the particular embodiments which are described, but is intended to cover all modifications and changes within the scope and spirit of the invention as described above and set forth in the appended claims.

What is claimed is:

1. A method of making a sample support plate for use in a MALDI mass spectrometer comprising the steps of:

a. forming a multifiber billet comprising a plurality of clad glass fibers, each of the clad glass fibers comprising a soluble glass core and an insoluble glass cladding;

b. cutting a cross-sectional wafer from the multifiber billet;

c. exposing the wafer to a dissolving medium selected to dissolve the glass cores; and d. controlling the time at which the wafer is exposed to the dissolving medium so that the glass cores are dissolved to a depth that is less than the thickness of the wafer.

2. The method of claim 1 comprising the step of rendering exposed surfaces of the wafer to be electrically conductive.

3. The method of claim 1 wherein the controlling step comprises the steps of removing the wafer from the dissolving medium;

rinsing the wafer to remove residual dissolving medium; and then drying the wafer.

4. The method of claim 1 wherein the dissolving medium used in step c. is an acidic solution.

5. The method of claim 1 comprising the step of applying a mask to one planar surface of the wafer so as to prevent dissolution of the glass cores on one side of the wafer.

6. The method of claim 1 wherein the step of cutting the cross-sectional wafer comprises the step of polishing the surfaces of the wafer before further processing.

* * * * *